May 25, 1971   F. P. SLOAN   3,579,650
VENTING DEVICE FOR TOILETS
Filed March 11, 1969   6 Sheets-Sheet 1

INVENTOR.
FRANK PHILIP SLOAN
BY *Rogers, Bereskin, & Parr*

May 25, 1971  F. P. SLOAN  3,579,650
VENTING DEVICE FOR TOILETS

Filed March 11, 1969  6 Sheets-Sheet 3

INVENTOR.
FRANK PHILIP SLOAN

BY Rogers, Bereskin, & Parr

May 25, 1971  F. P. SLOAN  3,579,650
VENTING DEVICE FOR TOILETS

Filed March 11, 1969  6 Sheets-Sheet 4

INVENTOR.
FRANK PHILIP SLOAN

BY Rogers, Bereskin, & Parr

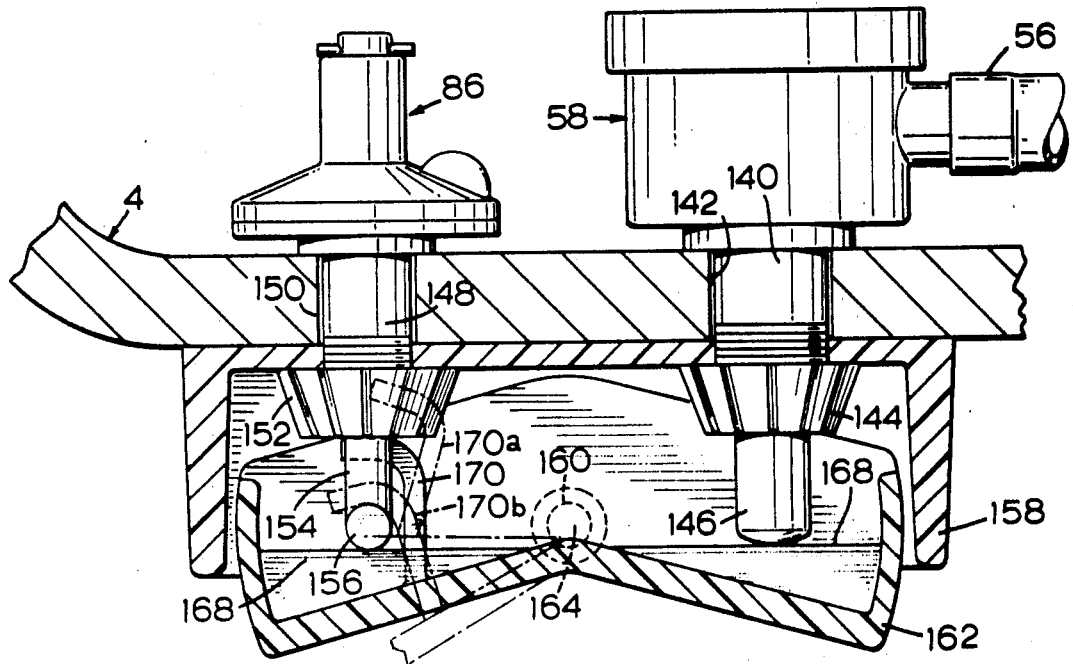
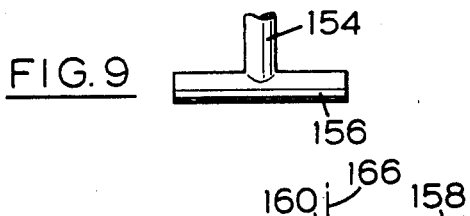
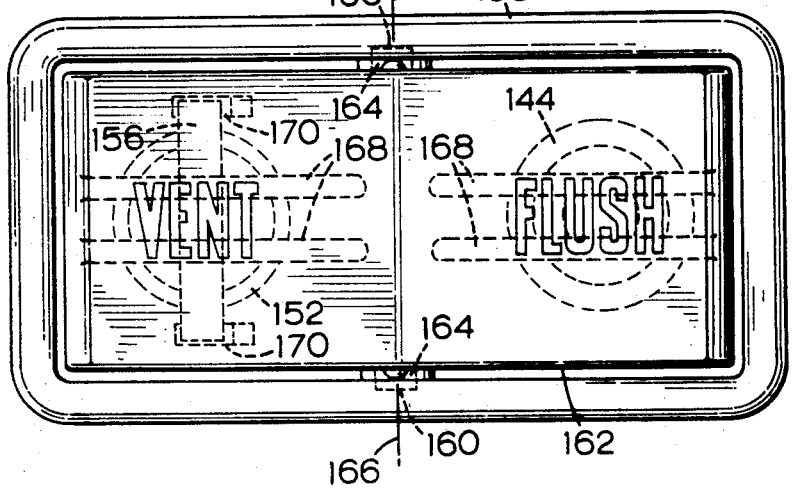

INVENTOR.
FRANK PHILIP SLOAN

BY
Rogers, Bereskin, & Parr

United States Patent Office 3,579,650
Patented May 25, 1971

3,579,650
VENTING DEVICE FOR TOILETS
Frank Philip Sloan, Toronto, Ontario, Canada, assignor to Aquair Corporation Limited, Nassau, Bahamas
Filed Mar. 11, 1969, Ser. No. 806,164
Int. Cl. E03d 9/04
U.S. Cl. 4—72
11 Claims

ABSTRACT OF THE DISCLOSURE

A device for sucking bathroom air through the rim holes of a toilet and for venting such air to a sewer. The device has a water trap preventing odor travel from the sewer to the room, an aspirator to empty the trap during use to permit air flow, and an inlet leg connected to the toilet flushing conduits at a location to be refilled by water flowing to the bowl during a flush, so that the trap can be refilled even if mains water pressure fails during venting. A check valve in the venting device prevent water trap emptying during air pressure fluctuations. In an alternative embodiment, venting is through an odor removing filter which also serves to collect spray water from the aspirator and to muffle aspirator noise.

---

This invention relates to an improved toilet venting system for venting undesirable odors from bathrooms.

Typical toilet venting systems operate by sucking the air from the room through the rim holes of a toilet bowl and through a vent pipe to the open part of the sewer pipe downstream from the toilet bowl trap. (It will be appreciated that the outlet pipe for most toilet bowls contains a water barrier to retain water in the bowl, and beyond the water trap the toilet outlet pipe is connected directly to a sewer and normally contains air.) In most such venting systems, power to provide the suction is obtained by a water spray.

A major difficulty with such prior art venting systems results from the fact that it is undesirable to have a direct air connection between the bathroom and the sewer except while venting is in progress, because of the possibility of undesirable odors rising from the sewer. Most plumbing codes require that the ducts of the venting system include a water trap between the sewer and the toilet rim holes, to prevent odors from travelling into the bathroom. The water for the water trap is normally supplied from the water mains, usually from the inlet valve of the toilet, but most plumbing codes require that additional precautions be taken to ensure the presence of a water trap at all times, because of the possibility that the water pressure may fail just at the time when the trap needs refilling. This would leave the trap without water and would result in a direct air connection between the sewer and the bathroom. Therefore, prior art venting systems have employed elaborate and expensive precautions to ensure the presence of a water trap at all times.

Accordingly, it is an object of the present invention in one of its aspects to provide a venting system having a water trap which is refilled from water stored in the tank of the toilet each time the toilet is flushed, thereby eliminating reliance upon water mains pressure to refill this trap. The invention, in another of its aspects, provides an improved aspirator arrangement, and in still another aspect, it provides an improved air filtering arrangement. Further objects and advantages of the invention will appear from the following disclosure, taken together with the accompanying drawings, in which FIG. 1 is a diagrammatic side view, partly in section, showing a vent device (not in section) according to the invention installed in a toilet tank with a siphon valve;

FIG. 8 is a sectional view showing the mounting of control valves for the vent device and siphon valve;

FIG. 9 is a side view of part of one of the control valves of FIG. 8;

FIG. 10 is a front view of the toilet tank showing the control valve arrangement;

Figure 5:
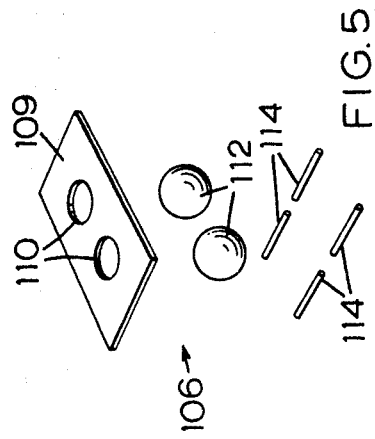
FIGS. 5 and 6 are exploded views showing parts of check valves used in the vent device.

The invention is primarily (but not exclusively) intended for use with a siphon valve of the type described in my co-pending patent application Ser. No. 704,593, filed Feb. 12, 1968, now Pat. No. 3,505,688. Such a siphon valve is shown generally at 2 in FIG. 1 as installed in a toilet tank 4. The siphon valve includes an inlet section or primary siphon 6 having an inlet leg 8 and an outlet leg 10 connected by an upper bend 11. The inlet section 6 is connected via an intermediate bend 12 to the inlet of an outlet section 14 consisting of a secondary siphon 16 and tertiary siphon 18. The outlet legs 19, 20 of the outlet section pass through the bottom of the tank 4 (being sealed by rubber seals 21) and discharge through a pipe 22 into the rim holes 24 of a toilet bowl 26 and into a duct 28 at the bottom of the toilet bowl.

The tank 4 is further provided with a conventional water inlet pipe 30, inlet float valve 32, tank refill conduit 34 (to refill the tank after a flush), and float arm 36 and float 38 to turn the inlet valve 32 on and off as the float rises and falls respectively. A bowl refill conduit 40 extends from the inlet valve 32 and meets a tubular column 42 rising from the upper bend 44 of the outlet section 14 of the siphon valve. A water lever indication 46 on column 42 indicates the correct water level 48 for the tank 4.

Finally, the siphon valve 2 includes a water reservoir 50 located between the inlet and outlet sections and formed by a pair of plates 51 extending between the outlet leg 10 of the inlet section and the outlet section 14. Reservoir 50 contains a drain hole 52 near its bottom. A primary air inlet 54 is located near the upper bend in outlet leg 10 and is connected via air hose 56 to an air release push button valve 58 which opens hose 56 to atmosphere when operated. A short tube 60 extends from primary inlet 54 to a secondary air inlet 62. The structure so far described is all fully discussed in the above mentioned patent application.

Figure 2:
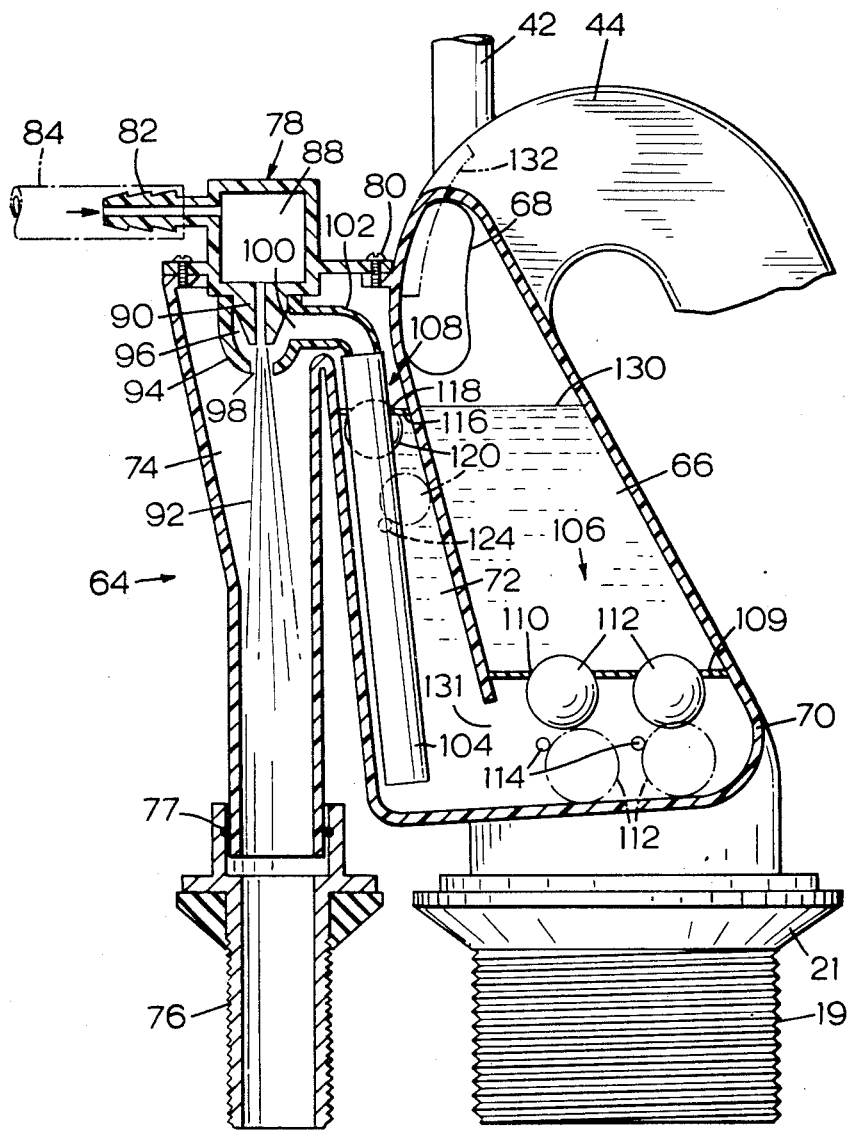
FIG. 2 is a side view, in section, of the vent device of FIG. 1.

Fitted to the side of the upper bend 44 of the outlet section of the siphon valve is a vent device 64, best shown in FIG. 2.

The vent device 64 includes an inlet leg 66 opening into an aperture 68 in the side of the upper bend 44. The inlet leg 66 is directed downwardly from the upper bend 44. A lower bend 70 is connected to the bottom of the inlet leg 66, to form a water trap, and an outlet leg 72 is connected to the lower bend 70. The outlet leg 72 communicates at its upper end with a sewer discharge leg 74, which is connected to a pipe 76 leading down to the open sewer (not shown) downstream from the toilet trap. To ensure that stresses will not occur when the combination siphon and vent device is inserted into a toilet tank, the discharge leg 74 is slidable in the pipe 76 and then union is sealed by an O-ring 77. This prevents the vent device from being torn off the siphon valve when nuts 79 (FIG. 1) are tightened on the pipe 76 and on the siphon valve outlet on the underside of the toilet tank to fasten them to the tank.

The tops of the legs 72, 74 are covered by a nozzle assembly 78 removably held in place by screws 80. The nozzle assembly 78 includes a serrated inlet tube 82 connected to a conduit 84 which leads (FIG. 1) to the outlet of a water valve 86 which controls operation of the vent device. The water valve 86 has an inlet connected via a conduit 89 to the water inlet pipe 30, which supplies power water for the venting unit.

Water entering the inlet tube 82 of the nozzle assembly passes through a chamber 88 (FIG. 2) to a nozzle 90 shaped to produce a long narrow water spray 92. The nozzle 90 is enclosed by a collar or shroud 94 spaced from the nozzle to define a narrow annular space or chamber 96 therebetween. The chamber 96 defined by collar 92 tapers inwardly at its bottom and has as shown a bottom opening 98 of just sufficient size so that it does not interfere with the water spray 92. The collar 92 also includes a side suction opening 100 of larger cross-sectional area than that of the nozzle 90. The suction opening 100 is defined by a tube 102 which extends into the outlet leg 72 and is there connected to a flexible hose 104 extending to the bottom of the outlet leg 72. The hose 104 serves to remove water from the water trap formed by lower bend 70 when venting commences, as will be described. The nozzle assembly 78, including the hose 104, can be inserted or removed as a unit from the remainder of the vent device. Hose 104 can if desired be a rigid tube molded integrally with the nozzle assembly.

The vent device also includes check valves generally indicated at 106. 108 in its inlet and outlet legs. The check valve 106 includes an upper plate 109 containing (see FIG. 5) two circular apertures 110, a pair of polyethylene balls 112, and two sets of ball retaining pins 114 projecting from the sides of the lower bend 70 (the pins 114 of each set need not meet at their centres). The balls 112 have a density less than that of water and are of a size to rise partly into and block the holes 110, when water in the vent device rises to the plate 109. This retards flow of water from the vent device 64 to the siphon valve 2. When there is no water in the lower bend 70, the balls 112 are guided by the retaining pins 114 to the dotted line position shown in FIG. 2, out of the way of the air flow through the vent device.

Figure 6:
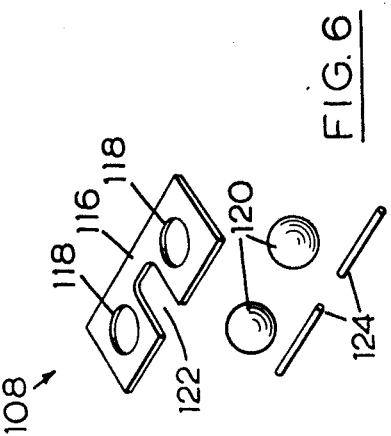
Figure 3:
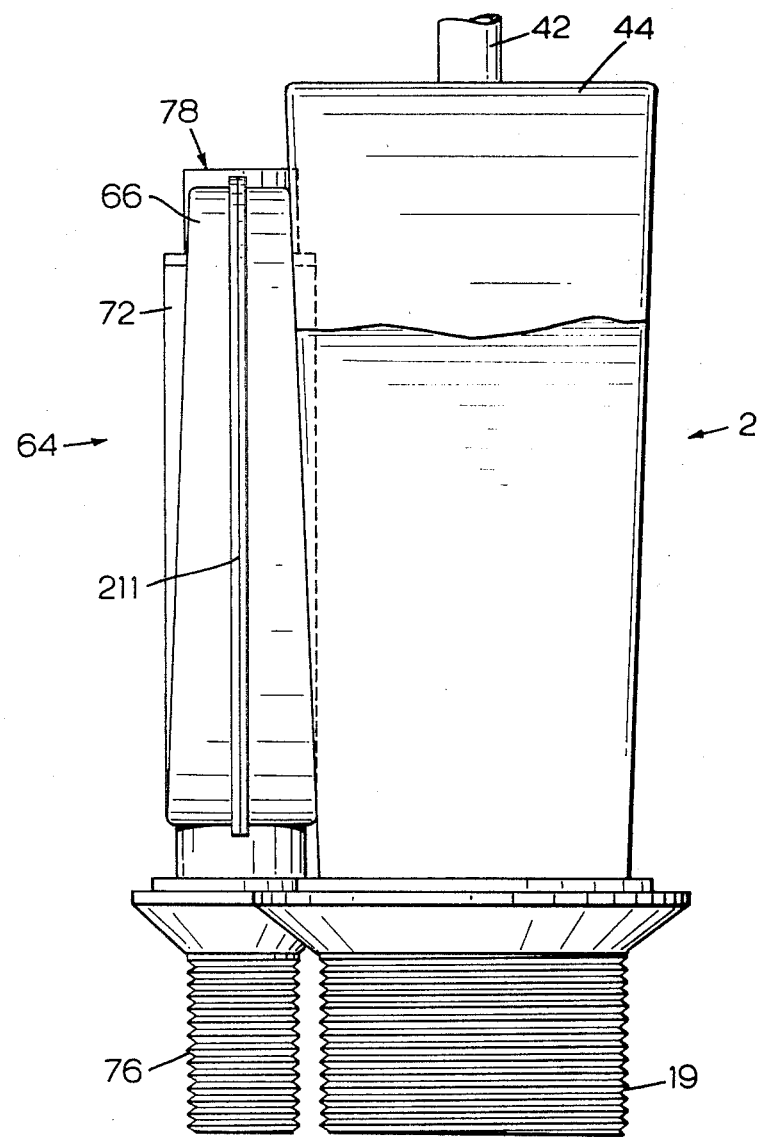
FIG. 3 is an end view of the vent device and siphon valve of FIG. 1.

The check valve 108 (see FIG. 6) is similar to check valve 106, but acts in the opposite direction, to prevent water from pouring through the vent device 64 from the siphon valve during a flush (although only about a cupful of water would be lost in this way if check valve 108 were not present). The check valve 108 includes a plate 116 containing apertures 118 to be plugged by polyethylene balls 120. The plate 116 has a further aperture 122 dimensioned to allow a loose fit for flexible hose 104 (to facilitate easy insertion of the nozzle assembly 78). A pair of ball retaining pins 124 extend from the sides of the outlet leg 70, to limit the downward movement of the balls 112 when there is no water in the vent device. The position of balls 120 when there is no water in the vent device is shown in chain dotted lines in FIG. 2. Check valve 108 is optional, and when present, the width of leg 72 (from left to right in FIGS. 2 and 3) will be slightly greater than shown, to maintain a constant cross-sectional area for air flow through the vent device.

The operation of the apparatus described is as follows. Before a flush, the tank 4 will normally be filled with water to the level 48. At this time, the siphon valve 2 will contain water in its inlet leg 8, in the lower bend 12, and in the right hand or inlet legs of the secondary and tertiary siphons 16, 18. The remaining portions of the siphon valve are filled with air. The trapped air 126 in the primary siphon 6 is compressed by the pressure of the water in the tank above it and serves to block flow of water through the siphon valve. In addition, the vent device contains water to the level 130 in its inlet and outlet legs 66, 72, to block odors from travelling up pipe 76 and through the vent device into the room.

When a person wishes to use the toilet, he will normally operate the venting valve 86 when he enters the room. The venting valve 86 allows pressure water from the water mains to spray through the nozzle 94, creating a downward air movement in the sewer discharge leg 74. The suction caused by the downward air movement in sewer discharge leg 74 lifts the water in the outlet leg 72. Because of the check valve 108 which tends to retard upward movement of water in the outlet leg 72 proper, most of the lifting force is concentrated on the water in the flexible hose 104, and the water in the hose 104 rapidly moves upwardly, fills the space 96 between the collar 94 and the nozzle 90, and is entrained by the water jet from the nozzle.

As power water continues to jet from the nozzle 90 and entrain water from the hose 104, the water in the vent device is rapidly evacuated. The "drag" of the water being entrained reduces the jet of water issuing from the collar aperture 98 to a lower velocity stream or dribble at this time. Because the water issuing from the collar aperture 98 is no longer a high velocity spray, there is little air suction in outlet leg 72 of the vent device at this time, so that the balls 120 of check valve 108 are allowed to move downwardly out of the holes 118 in check plate 116 as the water level in the vent device falls. (If the high velocity spray continued during water evacuation, the air suction might be so great as to hold balls 120 in their holes 118, thus in effect choking off part of the air passage.)

Once the water in the vent device is evacuated, the water jet from the nozzle 90 again flows rapidly through collar aperture 90, entraining air and creating suction which draws air through the toilet bowl rim holes 24, through the conduit 22 and outlet leg 20 of the siphon valve, through the vent device, and down the pipe 76 to the sewer. This serves to remove odors from the bathroom. To facilitate air flow, the cross-sectional area of the flow path in the vent device is preferably kept constant. Thus, the total area of the apertures 110 in check valve 106 is preferably the same as the total area of the apertures 118, 122 of check valve 108, and also the same as the area of the passage 130 (FIG. 2) between the left hand pins 114 and the wall between inlet and outlet legs 66, 72.

When the user wishes to flush the toilet, he operates the air release valve 58. This automatically shuts off the flow of water to the nozzle 90 in a manner to be described, terminating operation of the vent device. Operation of the push button 58 also opens the conduit 56 to the atmosphere, permitting the water pressure in the tank 4 to expel the air 126 in the inlet section of the siphon valve. With the air block 126 gone, water flows rapidly through the siphon valve, down the conduit 20 and into the toilet bowl 26 to flush the toilet. Some of this water also spills into the inlet leg 66 of the vent device, filling the vent device with a substantial supply of fresh water. The check valve 108 in the outlet leg 72 of the vent device prevents any tendency of water to pour straight through the vent device at this time.

As the water level in the tank 4 drops, the water level in the secondary reservoir 50 also drops, but it lags behind the water level in the tank, because of the relatively slow draining of the secondary reservoir through drain aperture 52.

When the water level in the tank has dropped nearly to the level of the bottom of the siphon valve inlet leg 8, the water level in the secondary reservoir drops below the secondary air inlet 62, exposing this inlet to atmospheric air. Air is then sucked into the secondary air inlet and interrupts the water flow to break the siphon and terminate the flush. The water level in the inlet leg 8 of the primary siphon then falls back to the water level in the tank, while the tertiary siphon 18, which is still primed, continues to draw water out of the outlet leg 10 of the primary siphon, the intermediate bend 12, and the inlet leg of the secondary siphon 16, until the water level in the intermediate bend 12 drops to the level of the inlet of the tertiary siphon 18.

Both during and after the flush, the inlet valve 32 continues to deliver water into the tank 4 through the tank refill tube 34. After the flush, the water level in the tank therefore begins to rise slowly. When the level in the tank passes above the drain aperture 52, water also enters the secondary reservoir, and the levels in the tank and secondary reservoir rise approximately in unison until the level in the secondary reservoir passes above the secondary air inlet 62 to close it off. The air trapped in the primary siphon 6 then begins to compress as the water rises in the tank.

As the water in siphon valve inlet leg 8 rises further, it spills over the upper bend 11 and drops to the intermediate bend 12. Because of the compressed air in outlet leg 10, water cannot rise in the leg 10. Therefore, the water spilling over the upper bend 11 increases the level in the right hand or inlet legs of the secondary and tertiary siphon 16, 18 and eventually the level in the tank reaches a height at which the float valve shuts off further water entry, at which time the situation is restored to that shown in FIG. 1. Further details of operation of the siphon flush device can be obtained from the above mentioned co-pending application.

During the flushing operation, as the water level in the tank drops below the upper bends 11, 44 of the siphon valve, the device acts as a siphon, with considerable suction. This tends to suck the water out of the vent device and tends to empty the vent device completely, which is undesirable.

This tendency is however prevented by the check valve 106 since its polyethylene balls 112 rise into the holes 110 in the plate 109 as soon as the water level reaches the plate 109, and prevent water from being pulled out of the vent device in the wrong direction.

If desired, one of the holes 110 in the plate 109 may be made slightly out of round, so that some water will be sucked from the vent device 64 during the latter stages of a flush. This has the advantage that when the venting valve 86 is actuated, there will be less water in the vent device to be sucked out through the hose 104. However, if less water is present in the vent device, then the downward air movement in the sewer discharge leg 74 at the start of venting must lift the water in hose 104 through a greater head before this water reaches the nozzle 90 and is entrained in the power water, and if water pressure is low, there may not be enough downward air movement to lift the water in hose 104 to the height of the nozzle. This can to some extent be compensated for by lowering the height at which the tube 102 crosses the dam between legs 72, 74 of the vent device, and in fact the tube 102 can even be placed in a notch in the dam between legs 72, 74.

Generally, the vent device can be made low enough in height so that the time delay required for water evacuation, before air venting begins is only two or three seconds, or less, and is not a problem. The entrainment of water from hose 104, by use of the nozzle and collar arrangement, with the large suction opening 100, results in more rapid water removal than would a common venturi with a pinhole at its constriction to suck water, and there is no hole in the side of the nozzle 90 to induct air into and interfere with the water jet. It is found, in fact, that the aspirator arrangement shown for evacuating the water from the vent device is so efficient that it may evacuate the water even when the power water pressure is too low (e.g. 12–14 pounds) to vent air. (Prior art vent devices typically require at least 20 pounds water pressure to empty their water traps.) Since it is undesirable to empty the water in the vent device and open the sewer to the bathroom if no air venting is going to occur, it may be desirable to move the tube 102 of the vent device slightly upwardly, above the dam between legs 72, 74, to a height at which at least a predetermined minimum power water pressure (enough to vent air, e.g. 15 pounds) is required to remove the water in the vent device.

The check valves 106, 108 have the following special advantage. In toilet installations in buildings, particularly high rise buildings, there are often considerable fluctuations in air pressure between the pressure in the bathroom and the pressure in the sewer, particularly on windy days. This can cause surging back and forth of the water in the vent device and might under adverse conditions cause emptying of the water in it. The check valves 106, 108 greatly dampen these oscillations and prevents emptying of the water trap in the vent device.

The check valve 106 has the following further advantage. Sometimes, during a flush, the sewer pipe (not shown) downstream of the toilet trap will become blocked, at a location downstream of the position where the vent discharge pipe 76 (FIG. 1) joins the sewer. The user will then use a plunger to attempt to clear the obstruction. The vent device will be filled with water at this time, since it fills during the flush, but if check valve 106 were not present, the pressure caused by the plunger would eject the water from the vent device. This would cause loss of all pressure generated by the plunger, making the plunger useless for removing the obstruction. In addition, there is a danger that contaminated water might be forced through the vent device into the toilet tank. However, the check valve 106 prevents water in the vent device from being forced out into the siphon valve 2 and prevents loss of plunger pressure.

The advantage of the water refill arrangement described for the vent device is that it is unlikely that circumstances can arise in which water is absent from the vent device except of course when the vent device is actually operating and sucking air. This is because should the water pressure fail after the vent device has been turned on to empty the trap, there will still be water in the tank 4 to refill the water trap formed by bend 70 and this can be done simply by flushing the toilet.

One way in which the water trap in the vent device could fail is if the user, after flushing the toilet and while the tank is refilling, operates the vent device. This would empty the water from the vent device. The user might then reflush the toilet, but if the water level in the tank 4 is still low, the siphon valve 2 will simply go through a correcting cycle in which water empties through the tertiary siphon 18, but no water passes through the secondary siphon 16 to refill the vent device.

Figure 4:
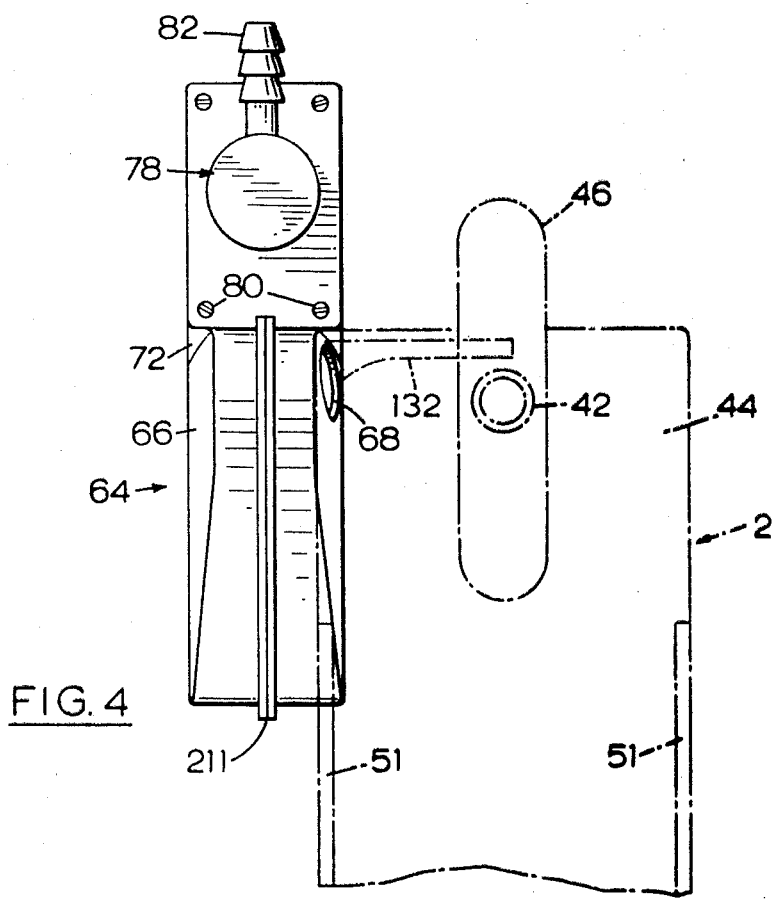
FIG. 4 is a top view of the vent device of FIG. 1 with the siphon valve shown in dotted lines.

To deal with this possibility, and also to meet many plumbing codes, refill water from the bowl refill conduit 40 can be directed into the vent device. This can be done in several ways. Firstly, the bowl refill column 42 can be moved over to direct its water flow into the top of the inlet leg 66 of the vent device. After the vent device is full, the excess water will run out the aperture or window 68 and will run down the outlet leg 19 of the siphon valve into the toilet bowl (because the bottom of window 68 is lower than the dam between legs 72, 74 of the vent device). Alternatively, a small flow deflector 132 shown in dotted lines in FIGS. 2 and 4 can be placed on the end wall of the upper bend 44, of the siphon valve to direct water flowing along the end wall from the bowl refill column 42 into the window 68.

Figure 1:
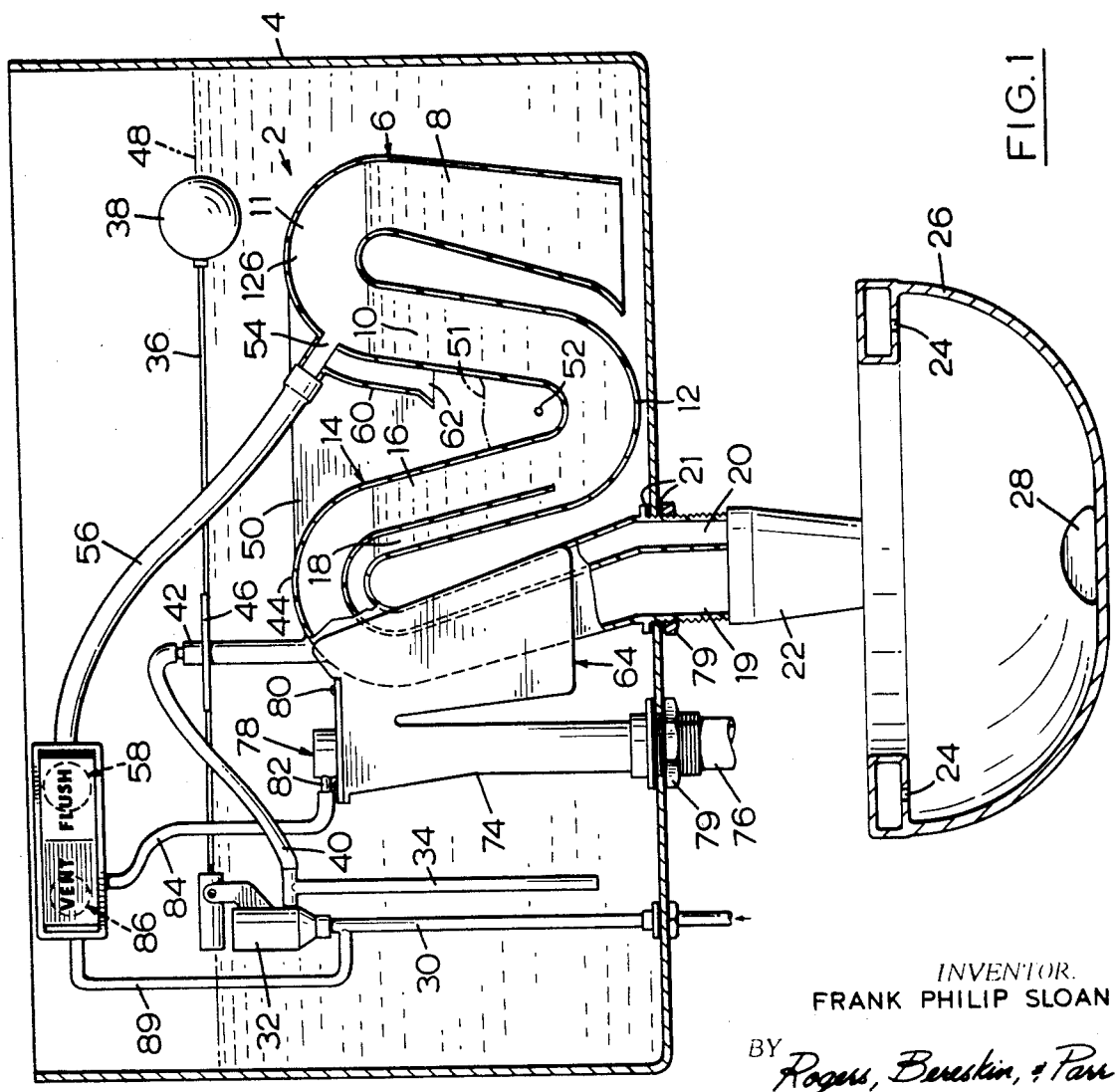
Figure 7:
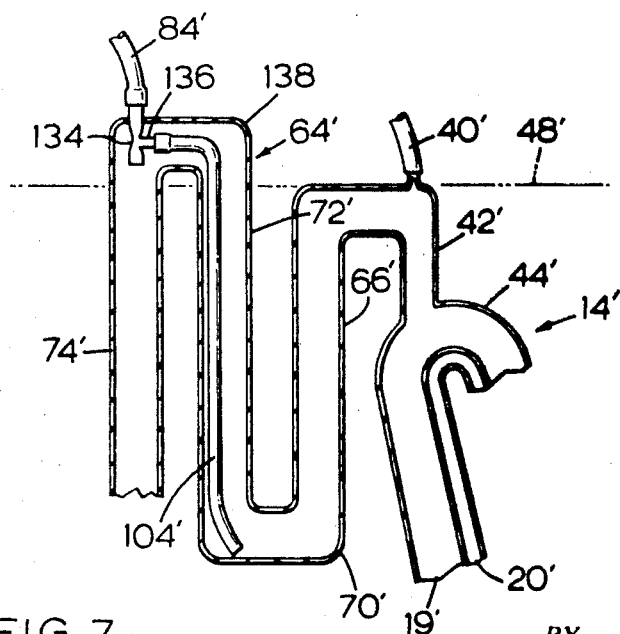
FIG. 7 is a side view, in section, showing a modified vent device.

If desired, the arrangement of FIG. 1 can be modified as shown in FIG. 7, where primed reference numerals indicate parts corresponding to those of FIGS. 1 to 6. In FIG. 7 the check valves 106, 108 have been eliminated, and the inlet leg 66′ has been connected to the end wall of the upper bend 44' via the bowl refill column 42', which has been enlarged for this purpose. The top of the leg 66' is typically placed at the normal water level 48' of the tank and acts as a correct water level indicator. In place of the nozzle and collar aspirator arrangement of FIGS. 1 to 6, the aspirator in the FIG. 7 arrangement is constituted by a venturi 134 supplied with power water from conduit 84' and having a suction inlet 136 at its constriction to which is connected the flexible hose 104'. The venturi is mounted in a U-tube 138 which clips onto the legs 72', 74'. This arrangement is more efficient in lifting water in hose 104' to the level of the venturi than is the nozzle and collar arrangement, but it is much less efficient at sucking water once the water has reached the aspirator than is the nozzle and collar arrangement of FIGS. 1 to 6.

Because of the height of the leg 66', the suction in the outlet section 14' of the siphon valve during the latter stages of a flush can no longer empty water from the vent device. By proper adjustment of the dimensions of the vent device, the suction will empty most of the water from the bend 70', leaving a volume of water in the bend sufficient to block air passage from one side of the vent device to the other but small enough so that the vent device need operate only for three to five seconds to empty the water trap and begin sucking air.

The flush and venting control valves 58, 86 will next be described, with reference to FIGS. 8 to 10. As there shown, flush control valve 58 includes a mounting projection 140 locatetd in a hole 142 in the wall of tank 4 and fastened thereto by a threaded cap 144. Projecting through cap 144 is a push button 146. When button 146 is depressed, it operates a standard valve mechanism to open conduit 56 (FIG. 1) to atmosphere. Typically, valve 58 will (as shown in the above mentioned co-pending application) include a valve member urged against a sealing rubber member by a spring so that when such valve member is pushed by pushing the push button 146, it opens to atmosphere a chamber which communicates with the conduit 56. When the push button 146 is released, the spring (not shown) returns the valve 58 to closed condition.

The venting control valve 86 similarly includes a mounting projection 148 located in a hole 150 in the wall of tank 4 and held thereto by a threaded cap 152. Projecting through 152 is a push button 154 having a crossbar 156 at its tip (see FIG. 9). The venting control valve 86 may be any conventional type of water control valve and may typically have a valve spool normally sealing the water inlet and outlet conduit 89, 84 (FIG. 1) from each other but allowing communication between them when the crossbar 156 is pushed in.

The push buttons 146, 154 form part of a control box 158 secured to the outside of the toilet tank 4 by the threaded caps 144, 152. The box 158 is rectangular in form, as shown in FIG. 10 and includes a pair of notches 160 near the top centre of each side. The notches 160 serve as hinge points for a rocket member 162 formed generally in the shape of an upside down V with widely diverging arms, as shown in the drawings. Small protrusions 164 in the rocker 167 snap into the notches 160 so that the rocker may be rocked back and forth about the axis 166 through the protrusions.

The rocker 162 includes raised ridges 168 which, when the rocker is centered as shown in solid lines in FIG. 10, normally contact the air release push button 146 and the crossbar 156 of venting valve 86. Rocker 162 also includes a pair of hooks 170 extending from its inner surface under the crossbar 156. The hooks 170 are located at the sides of member 162 so as not to interfere with the threaded cap 152 on valve 86.

When the device is to be operated, a user first pushes the left hand side of the rocker 162. This side is labelled "VENT" in FIG. 10. This causes power water to be supplied to the nozzle 90 (FIG. 2), starting the vent device. Since there is no spring in the valve 86, the vent unit remains on until further actuation. The position of hooks 170 at this time is shown in dotted lines at 170a in FIG. 8.

When the user wishes to flush the toilet, he pushes the right hand side of the rocker 162. This performs two operations. Firstly, the hooks 170 engage crossbar 156 and pull it out to shut off valve 86. The position of hooks 170 just after completing this task is shown in dotted lines at 170b in FIG. 10. When the valve 86 is closed, this turns off the vent device. Secondly, the ridges 168 at the right hand side of the rocker 162 depress the air push button 146, opening the conduit 56 to atmosphere and commencing the flushing cycle. The rocker 162 is normally held in this position for approximately one to two seconds and is then released, at which time the spring (not shown) in valve 58 returns the rocker 160 to the full line position shown in FIG. 10.

Figure 11:
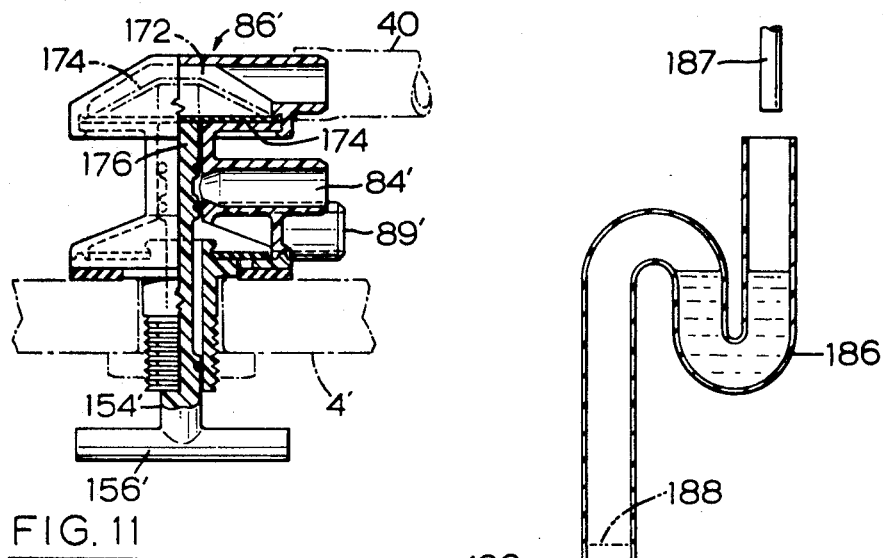
FIG. 11 is a side sectional view showing a modified control valve for the vent device.

The control valve arrangement shown has the advantage that the vent device is automatically turned off when the toilet is flushed. If desired, this may be achieved in other ways, as shown for example in the embodiment of FIG. 11, where primed reference numerals indicate parts corresponding to those of FIGS. 8 to 10. In FIG. 11, the valve 86' for the vent device includes at its rear a chamber 172 connected to the outlet conduit 40 from the float valve. The chamber 172 includes a diaphragm 174 on which a push rod or spool 176 of the valve 86' presses. When the valve spool is depressed, the diaphragm 174 is pressed to the position shown in dotted lines, and it remains in this position during operation of the vent device, since the diaphragm 174 is made without sufficient resiliency to move the valve spool back to its full line position. When the toilet is flushed, however, water pressure from the float valve enters the chamber 172, pushes on the diaphragm 174, and returns the valve spool 176 to its full line position, turning the vent device off.

A particular advantage of the type of control arrangement shown in FIGS. 8 to 10, and also of the control of FIG. 11, is that the only way that the vent device can be conveniently turned off is by flushing the toilet. This ensures that a user will not use the vent device and then simply turn it off without flushing the toilet, which would leave the water trap 70 empty.

Figure 12:
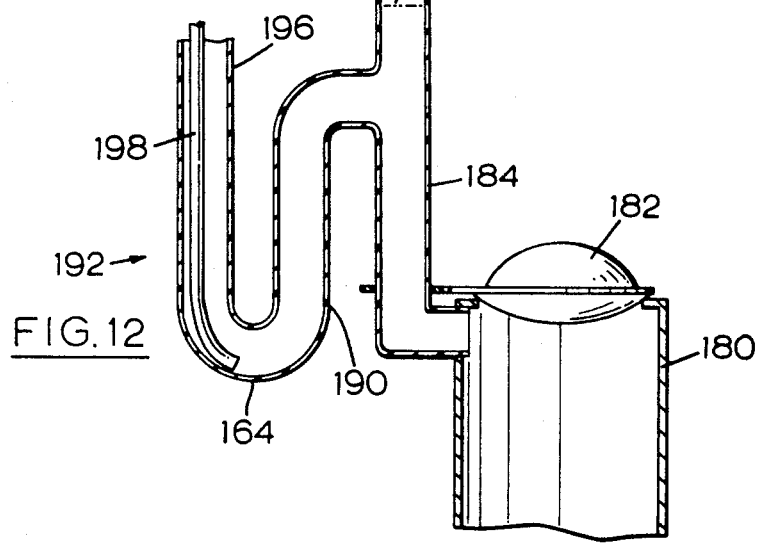
FIG. 12 is a sectional view of the vent device used with a conventional flapper valve type of toilet.

Reference is next made to FIG. 12, which shows a modification of the invention for use with an ordinary flapper valve type of toilet. Such a toilet has an outlet pipe 180 leading to a toilet bowl, a flapper valve 182 which normally closes this pipe but which can be lifted by a chain (not shown) connected to a flush handle (not shown) when the toilet is to be flushed, and an overflow pipe 184. The overflow pipe 184 empties into the outlet pipe 180 below the flapper valve 182 and is provided in all conventional toilets to prevent the water level in the tank from rising too high when the float valve malfunctions or when the float sticks.

In conventional toilets the overflow pipe 184 extends directly above the normal water level in the tank. However, in this embodiment, part of the overflow pipe is used as a conduit through which air is sucked and vented from the bathroom. Therefore the top of the overflow pipe should be sealed. This is accomplished by providing a small water trap 186 at the top of the overflow pipe 184 by providing a U-section in the pipe. The water trap 186 can be filled by a bowl refill tube 187 carrying water from the float valve and emptying into the trap 186, or it can be filled in any other desired manner. (In the siphon valve 2 of FIG. 1, the tertiary siphon 18 acts as an overflow pipe and is sealed, as is the secondary siphon 16, by water in the intermediate bend 12. Therefore there is no need to provide the FIG. 1 embodiment with a special water trap such as trap 156).

It has been discovered that in most conventional toilets, there is considerable resistance to flow of water down the outlet pipe 180 when the toilet is flushed, and consequently, the water level in the overflow pipe rises when the toilet is flushed. Normally, before a flush, the overflow pipe 184 is filled with air, except for the water trap 186 at its top. The level to which the water in the overflow pipe may typically rise during a flush is shown at 188.

This rise of water in the overflow pipe 184 can be used to refill the trap or lower bend in the vent device. Accordingly, the inlet leg 190 of a vent device 192 is connected to the overflow pipe 184 at a position to receive water during a flush. This water enters a central bend 164 connected to an outlet leg 196. The outlet leg 196 is connected to an aspirator (not shown) similar to that of either the FIGS. 1 to 6 embodiment or the FIG. 7 embodiment, with a hose 198 to empty the central bend when the vent device is operated. Again, this ensures that the water trap 194 can be filled even if the water pressure fails during venting.

It is not essential to place a check valve similar to valves 106, 108 in the venting device 192, since there is little or no suction during flushing of a conventional toilet tending to draw water from the central bend 194. However, a check valve will ensure that the bend 194 will not be emptied during surges caused by air pressure variations and can be used if desired.

Figure 13:
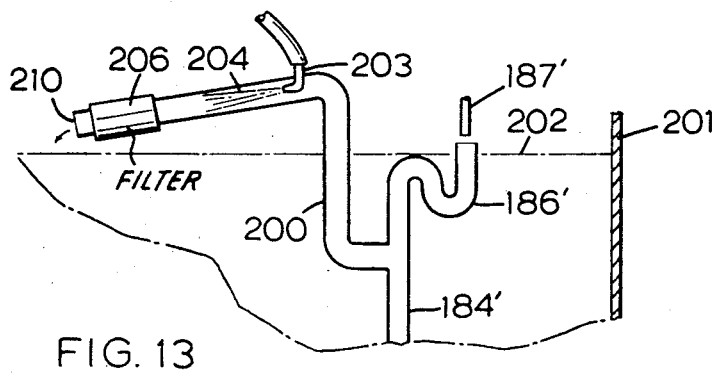
FIG. 13 is a sectional view of a further vent device used for filtering air.

If desired, the air sucked by the vent devices illustrated can be passed through a filter, such as an activated charcoal filter, and discharged back into the room instead of being vented to a sewer. Any of the embodiments illustrated may be used in this way. FIG. 13 illustrates such an arrangement for the FIG. 12 embodiment.

In FIG. 13, where primed reference numerals indicate parts corresponding to those of FIG. 12, a venting conduit 200 is connected to the overflow pipe 184 of a conventional toilet tank 201. Conduit 200 extends upwardly to a position above water level 202 in the tank, to a height above the level to which water will rise in the toilet tank should the float valve fail in an on condition. Located in the conduit 200 is a conventional spray nozzle 203 which creates a spray 204 to entrain air, to suck air up through the overflow pipe into the conduit 200. The nozzle 203 thus constitutes an aspirator.

The conduit 200 slopes downwardly and is blocked, downstream of the nozzle 203, by a removable filter cartridge 206 containing filtering material such as activated charcoal. The spray water and the air being filtered both pass through the filter cartridge 206, and the spray water, which trickles out the bottom of the filter, runs out the end of conduit 200 and drips back into the toilet tank 202. The open end of conduit 200 is placed just above the level to which water will rise in the tank should the float stick. This is so that water running from conduit 200 will have only a short distance to fall, reducing dripping noises.

Placement of the filter cartridge 206 upstream of where the spray water is returned to the tank has the advantage that the filter acts as a muffler to reduce the noise of the water spray (which is otherwise quite loud). The filter cartridge also serves to collect the spray, which is commonly so highly atomized that much of it may otherwise escape through air outlet 210.

The vent devices illustrated are typically moulded in plastic, usually (except for the simple FIG. 13 embodiment) as two halves which are then joined together e.g. by solvent welding. In the FIG. 1 to 6 embodiment, the siphon valve and the entire vent device except for the nozzle and collar assembly, can be moulded from plastic as two open halves which are then joined together after insertion of check valves 106, 108. The seams at which the two halves are joined are shown at 210 in FIGS. 3 and 4.

Although two balls 100 have been shown for the check valves 106, 108, only one ball, or more than two balls, could be used if desired. In addition, other types of check valves can be employed, although the self cleaning properties of the check valve shown are desirable.

What I claim as my invention is:

1. In a toilet having a tank which stores flush water, a bowl below said tank, and a conduit communicating from said tank to said bowl and normally filled with air but conducting said stored flush water from said tank to said bowl during a flush; a vent device for sucking bathroom air through the rim holes of said bowl and for venting such air to a sewer comprising,
    (a) a U-shaped tube having a central bend and inlet and outlet legs extending upwardly from said central bend; said inlet leg being connected to said conduit at a position to receive some of said stored flush water passing through said conduit when said toilet is flushed,
    (b) means including aspirator means connected to the top of said outlet leg and operable to suck air from said conduit through said inlet and outlet legs when said central bend is clear of water and to vent such air to said sewer,
    (c) and means including a further conduit connected between said central bend and said means (b) to suck water from said central bend when said means (b) is activated, thereby providing an air passage unobstructed by water through said inlet leg, said central bend and said outlet legs, whereby said central bend is refilled with stored flush water from said tank each time said toilet is flushed.

2. Apparatus according to claim 1 wherein said means (b) comprises a nozzle having an outlet adapted to spray water along a predetermined axis, a collar enclosing said nozzle, said collar defining a chamber around said nozzle having at the location of said outlet a cross-sectional area in a plane transverse to said axis substantially larger than that of said outlet, said chamber having a reduced cross-sectional area in a plane transverse to said axis at a location slightly downstream of said nozzle and having an outlet opening located closely adjacent said outlet of said nozzle, said outlet opening being aligned with said outlet of said nozzle and being of size just sufficient for the water sprayed from said nozzle normally to clear said collar, thereby restricting said chamber, said collar having a suction opening spaced from said outlet opening and communicating with said outlet opening via said space, said further conduit means being connected to said collar at said suction opening and extending into said outlet leg whereby when said means (b) is activated, said water in said central bend will be sucked up said further conduit and entrained in said water from said nozzle.

3. Apparatus according to claim 1 including first valve means actuable for operating said aspirator means, second valve means actuable for flushing said toilet, a common control member for actuating and deactuating said first and second, valve means, and mechanical linking means connecting said control member and said first and second valve means so that said first valve means can be deactuated only by operating said control member to actuate said second valve means to flush said toilet.

4. Apparatus according to claim 1 including check means in said tube to retard the flow of water from said outlet leg to said inlet leg.

5. An aspirator adapted for use with a vent device for venting air from a bathroom, said vent device being of the type including conduit means for conducting air from said bathroom, said conduit means having a portion normally being blocked by a water trap except during venting, said aspirator comprising
    (a) a nozzle having an outlet adapted to spray water along a predetermined axis,
    (b) a collar enclosing said nozzle, said collar defining a chamber around said nozzle having at the location of said outlet a cross-sectional area in a plane transverse to said axis substantially larger than that of said outlet, said chamber having a reduced cross-sectional area in a plane transverse to said axis at a location slightly downstream of said nozzle and having an outlet opening located closely adjacent said outlet of said nozzle, said outlet opening being aligned with said outlet of said nozzle and being of size just sufficient for the water sprayed from said nozzle normally to clear said collar, thereby restricting said chamber, said collar having a suction opening spaced from said outlet opening and communicating with said outlet opening via said space, (c) means connecting said nozzle and said collar with said conduit, for air beyond said outlet opening entrained by water sprayed from said nozzle to suck air from said conduit means, (d) and a tube connected to said collar at said suction opening and extending into said portion of said conduit means so that when water is sprayed through said nozzle, water in said portion of said conduit means will be sucked up said tube and entrained in said water from said nozzle.

6. An aspirator according to claim 5 wherein said suction opening is of larger cross-sectional area than said outlet.

7. A vent device for sucking bathroom air through the rim holes of said bowl and for venting such air to a sewer, for use with a toilet having a tank, a bowl below said tank, and a conduit communicating from said tank to said bowl and normally filled with air but containing water during a flush, said vent device including (a) a U-shaped tube having a central bend and inlet and outlet legs extending upwardly from said central bend, said inlet leg being connected to said conduit at a position to receive water therefrom when said toilet is flushed, (b) means including aspirator means connected to the top of said outlet leg and operable to suck air from said conduit through said inlet and outlet legs when said central bend is clear of water and to vent such air to said sewer, (c) means including a further conduit connected between said central bend and said means (b) to suck water from said central bend when said means (b) is activated, (d) said means (b) comprising a nozzle having an outlet adapted to spray water, collar means enclosing said nozzle and having an outlet opening aligned with said outlet of said nozzle, said outlet opening being of size sufficient for the water sprayed from said nozzle normally to clear said collar means, said collar means and nozzle defining a space therebetween, said collar means having a suction opening spaced from said outlet opening and communicating with said outlet opening via said space, said further conduit means being connected to said collar means at said suction opening and extending into said outlet leg whereby when said means (b) is activated, said water in said central bend will be sucked up said further conduit and entrained in said water from said nozzle, (e) and an air discharge leg connected to the top of said outlet leg and communicating with said outlet leg, said means (b) forming an assembly removably connected across the tops of said outlet and discharge legs with said outlet opening of said collar means being located in said discharge leg, said further conduit means being a flexible hose, whereby said means (b), with said nozzle, collar means, and further conduit means, may be removed as an assembly from said vent device.

8. A vent device according to claim 7 wherein said outlet leg includes a check valve therein to retard water flow from said outlet leg to said discharge leg except through said flexible hose.

9. A vent device for sucking bathroom air through the rim holes of said bowl and for venting such air to a sewer, for use with a toilet having a tank, a bowl below said tank, and a conduit communicating from said tank to said bowl and normally filled with air but containing water during a flush, said vent device including (a) a U-shaped tube having a central bend and inlet and outlet legs extending upwardly from said cental bend, said inlet leg being connected to said conduit at a position to receive water therefrom when said toilet is flushed, (b) means including aspirator means connected to the top of said outlet leg and operable to suck air from said conduit through said inlet and outlet legs when said central bend is clear of water and to vent such air to said sewer, (c) and means including a further conduit connected between said central bend and said means (b) to suck water from said central bend when said means (b) is activated, (d) and a check valve located in said inlet leg to permit flow of water from said inlet leg to said outlet leg but to retard flow of water from said outlet leg to said inlet leg.

10. A vent device according to claim 9 wherein said check valve includes a check plate and at least one loose ball member of a density less than that of water, located below and cooperating with said check plate, said plate having a hole therein of a size to be substantially plugged by said ball member when said ball member rises into said hole.

11. A vent device for sucking bathroom air through the rim holes of said bowl and for venting such air to a sewer, for use with a toilet having a tank, a bowl below said tank, a float valve which admits water into said tank upon initiation of a flush, and a conduit communicating from said tank to said bowl and normally filled with air but containing water during a flush, said vent device including (a) a U-shaped tube having a central bend and inlet and outlet legs extending upwardly from said central bend, said inlet leg being connected to said conduit at a position to receive water therefrom when said toilet is flushed, (b) means including aspirator means connected to the top of said outlet leg and operable to suck air from said conduit through said inlet and outlet legs when said central bend is clear of water and to vent such air to said sewer, (c) means including a further conduit connected between said central bend and said means (b) to suck water from said central bend when said means (b) is activated, (d) and further valve means actuable for operating said aspirator means, said further valve means including means coupled to said float valve for water pressure supplied from said float valve to deactuate said first valve means thus to terminate operation of said aspirator means upon initiation of a flush.

References Cited
UNITED STATES PATENTS

| 2,606,326 | 8/1952 | Niccolai | 4—43 |
| 2,920,329 | 9/1960 | Niccolai | 4—43 |
| 1,389,896 | 9/1921 | Pfau | 4—215 |
| 2,406,507 | 8/1946 | Owens | 4—215 |
| 2,443,705 | 6/1948 | Fitzgerald | 4—215 |
| 2,603,797 | 7/1952 | Baither | 4—214 |
| 3,188,658 | 6/1965 | Dixon | 4—215 |

LAVERNE D. GEIGER, Primary Examiner

H. K. ARTIS, Assistant Examiner

U.S. Cl. X.R.

4—215